United States Patent
Mack (10) Patent No.: US 8,996,236 B2
(45) Date of Patent: Mar. 31, 2015

(54) METHOD FOR DETECTING OFFSET FOR A PEDESTRIAN PROTECTION DEVICE

(75) Inventor: Frank Mack, Seoul (KR)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 11/794,647

(22) PCT Filed: Oct. 19, 2005

(86) PCT No.: PCT/EP2005/055359
§ 371 (c)(1),
(2), (4) Date: Jul. 2, 2007

(87) PCT Pub. No.: WO2006/072480
PCT Pub. Date: Jul. 13, 2006

(65) Prior Publication Data
US 2009/0276112 A1    Nov. 5, 2009

(30) Foreign Application Priority Data
Jan. 4, 2005   (DE) .................... 10 2005 000 657

(51) Int. Cl.
*B60R 21/34*     (2011.01)
*B60R 21/0132*   (2006.01)
*B60R 21/013*    (2006.01)
*B60R 21/0136*   (2006.01)

(52) U.S. Cl.
CPC .......... *B60R 21/0132* (2013.01); *B60R 21/013* (2013.01); *B60R 21/0136* (2013.01); *B60R 21/34* (2013.01)
USPC ............................ 701/31.4; 180/274; 280/735

(58) Field of Classification Search
CPC ............................ B60R 21/34; B60R 21/0136
USPC ................. 701/29, 34, 45; 340/438; 280/735; 180/274
See application file for complete search history.

(56) References Cited

U.S. PATENT DOCUMENTS

| | | | |
|---|---|---|---|
| 2001/0010424 A1* | 8/2001 | Osmer et al. ................. 280/735 |
| 2003/0040856 A1* | 2/2003 | Winner et al. ................. 701/34 |
| 2003/0105569 A1* | 6/2003 | Roelleke ........................ 701/45 |
| 2003/0112133 A1* | 6/2003 | Webb et al. ................... 340/436 |
| 2003/0149530 A1* | 8/2003 | Stopczynski ................. 701/301 |
| 2004/0016457 A1* | 1/2004 | Bolland ......................... 137/391 |
| 2004/0064230 A1 | 4/2004 | Takafuji et al. |
| 2004/0129479 A1* | 7/2004 | Ozaki ............................ 180/274 |
| 2004/0212180 A1* | 10/2004 | Strutz et al. ................... 280/735 |
| 2005/0080530 A1* | 4/2005 | Arduc et al. .................... 701/37 |
| 2005/0104721 A1* | 5/2005 | Mae et al. ..................... 340/436 |
| 2005/0161273 A1* | 7/2005 | Makita et al. ................. 180/274 |
| 2006/0180380 A1* | 8/2006 | Munch et al. ................. 180/274 |
| 2007/0179693 A1* | 8/2007 | Dukart et al. .................. 701/45 |
| 2007/0276566 A1* | 11/2007 | Diebold et al. ................ 701/45 |

FOREIGN PATENT DOCUMENTS

| | | |
|---|---|---|
| DE | 103 21 209 | 12/2004 |
| GB | 2396942 | 7/2004 |

(Continued)

*Primary Examiner* — John Q Nguyen
*Assistant Examiner* — Rodney P King
(74) *Attorney, Agent, or Firm* — Kenyon & Kenyon LLP (57) ABSTRACT

A method for detecting offset for a pedestrian protection device, in which sensor data are ascertained and evaluated for determining an impact point of an object. In the event of a collision with an object, characteristics are extracted for determining the offset of the impact point using the sensor data from at least two sensors, absolute values and/or differential values and/or composite values and/or maximum values and/or minimum values of the sensor data from the at least two sensors being determined in the characteristics extraction.

26 Claims, 4 Drawing Sheets

(56) References Cited

FOREIGN PATENT DOCUMENTS

| | | |
|---|---|---|
| JP | 2004003938 | 1/2004 |
| JP | 2004196239 | 7/2004 |
| JP | 2004196239 A * | 7/2004 |
| JP | 2005521584 | 7/2005 |
| JP | 2006512245 | 4/2006 |
| WO | WO 03/082639 | 10/2003 |
| WO | 2004/058545 | 7/2004 |

* cited by examiner

METHOD FOR DETECTING OFFSET FOR A PEDESTRIAN PROTECTION DEVICE

FIELD OF THE INVENTION

The present invention relates to a method for detecting offset for a pedestrian protection device, in which the distance of an impact point of an object to a vehicle center axis is denoted as offset.

BACKGROUND INFORMATION

Due to the announcement of the introduction of an EU law for reducing injuries to a pedestrian in a collision between a pedestrian and a vehicle, new vehicles must be constructed in such a way that the injuries to the pedestrian in a collision remain within the limits required in this EU law.

A first strategy for reducing injuries to pedestrians is aimed at creating a crumple zone for the pedestrian by making changes to the bumper and the design of the vehicle, to thereby reduce the risk of injury using a passive solution.

A second strategy attempts to detect the impact of a pedestrian using a suitable sensor system, and to create the necessary crumple zone by the subsequent active triggering of a pedestrian protection device such as exterior airbags on the A-pillars and/or by raising the engine hood. In the active solution, widely differing sensor principles of acceleration sensors, pressure sensors, knock sensors, piezoelectric to optical sensors, etc., may be used.

SUMMARY OF THE INVENTION

The exemplary method of the present invention for detecting offset for a pedestrian protection device has the advantage that a robust offset detection is made possible by extracting characteristics from the sensor data of at least two sensors in the event of a collision with an object. In addition, it is advantageously possible to state whether the impact has occurred with a large offset, i.e., with a large distance to the vehicle center axis, or with a smaller offset, i.e., with a small distance to the vehicle center axis. In the characteristics extraction, for instance, absolute values and/or differential values and/or composite values and/or maximum values and/or minimum values of the sensor data of the at least two sensors are determined.

The exemplary method of the present invention permits a more precise and more robust detection of the impact point of a pedestrian or a person on the bumper in the y-direction. The result is that a reliable and more robust triggering of the protection arrangement for pedestrians becomes possible in that, for example, the triggering thresholds are selected differently depending on the impact point, thereby permitting a more precise differentiation of pedestrians from other objects. In this manner, the potential for protecting pedestrians is increased, while at the same time the costs which can result due to an unintentional triggering of the pedestrian protection device, e.g., in response to collisions with other objects, are minimized. In addition, the driver is prevented from being irritated by a triggering, e.g., putting up the engine hood, and being impaired in his/her steering performance.

Advantageous improvements to the method for detecting offset for a pedestrian protection device are provided by the measures and further refinements described herein.

It is particularly advantageous that vehicle data, which may be made available by a vehicle bus system, are used for the characteristics extraction, the vehicle data including the vehicle's own speed and/or a yaw rate and/or a relative speed between the vehicle and an object. The relative speed may be ascertained, for instance, by a radar sensor system, an ultrasonic sensor system, a video system, etc. For example, with knowledge of the vehicle's own speed or the relative speed, it is possible to more accurately determine instants in time and time intervals for the offset detection. The knowledge of the yaw rate is able to supply information about the probable contact side in the case of a swerving maneuver.

A first characteristic for determining offset is extracted, for example, from a comparison of the differential signal and the composite signal of the sensor data of the at least two sensors. Given a symmetrical arrangement of the two sensors relative to the vehicle center axis, the sensor data are virtually identical for an impact without offset. This means that the differential signal between the sensor data of the at least two sensors is virtually zero, while the composite signal of the two sets of sensor data assumes large values. In the event of a small offset, the sensor data from the at least two sensors swing in phase opposition. This means that the differential signal is large, while the composite signal cancels out almost to zero. In the case of a large offset, one of the at least two sensors detects markedly greater sensor data than the other of the at least two sensors, the phase relationship between the two sets of sensor data being such that the differential signal is approximately as great as the composite signal.

On the basis of these properties, the composite signal and the differential signal of the sensor data from the at least two sensors advantageously permit a statement about the offset of an object impact.

It is particularly advantageous if, prior to the signal comparison, the absolute values of the differential signal and of the composite signal, respectively, are formed and summed up over time, the ratio of the absolute value of the differential signal and the absolute value of the composite signal being formed for the signal comparison, for example. More robust values are thereby yielded for the offset detection.

To extract a second characteristic, in each case the absolute values of the sensor data from the at least two sensors are summed up. The maximum value and the minimum value of the summed-up absolute values are subsequently ascertained and compared to each other. Based on the comparison of the absolute values of the sensor data from the at least two sensors situated symmetrically relative to the vehicle center axis, it can easily be detected whether the impact took place on the right or the left side of the vehicle. This information concerning the contact side may likewise be made available to the decision logic for pedestrian protection arrangement. Thus, specific restraining devices, e.g., airbags in the A-pillar, may be activated only on one side of the vehicle, or with different strengths on both sides of the vehicle.

For example, to form the second characteristic, the ratio of the ascertained maximum value and the ascertained minimum value is formed, from which the value 1 is subtracted for better representability.

Compensation factors are used advantageously to compensate for an unsymmetrical front structure of the vehicle and/or an unsymmetrical arrangement of the at least two sensors relative to the longitudinal vehicle axis. The respective sensor data of the at least two sensors are then multiplied by different compensation factors, so that in the case of an impact without offset, the magnitudes of the at least two sets of sensor data are equal after the compensation.

To determine offset, the first characteristic and/or the second characteristic may be evaluated at at least one predefined instant in time. By the stipulation of corresponding instants, the two characteristics may be evaluated at the same instant or at different instants. In addition, the stipulation of the evaluation instant advantageously permits the characteristics to be evaluated at an optimal instant.

To determine offset, additionally or alternatively an average value of the first characteristic and/or an average value of the second characteristic may be evaluated within at least one predefined time interval. The average values of the two characteristics may be evaluated in the same time interval or in different time intervals.

The evaluation instant and/or the evaluation time interval for determining offset may advantageously be established as a function of vehicle data, which may be made available via a bus system. In this manner, the method for determining offset may be integrated optimally into a method for triggering the pedestrian protection device, and the necessary information about the offset may be made available at a suitable instant.

A characteristics space formed by the first and second characteristics may advantageously be partitioned by various thresholds into a plurality of regions, which may be into three or five regions. To determine offset, it is then checked whether the first and second characteristics are located in one of the plurality of regions. If this is the case, then the value assigned to the region is output as offset.

If the first and second characteristics are not located in any of the plurality of regions, then an implausible situation is recognized and a default value is used for determining the offset.

For an offset detection that is even more precise and robust, further characteristics for determining offset may be formed advantageously from vehicle data and/or from a time interval and/or a sign of the maximum values and/or minimum values of the sensor data of the at least two sensors. Detection of the contact side may be improved by considering the sign of the sensor data of the at least two sensors.

Advantageously, a pedestrian protection arrangement may be triggered on only one side of the vehicle or with different strengths on both sides of the vehicle as a function of the offset value ascertained.

In addition to improving the pedestrian sensing, the method for offset detection described here may also be used for improved vehicle-crash sensing if acceleration sensors are installed in the vehicle bumper. It is particularly advantageous if the same acceleration sensors are used for pedestrian protection and for improved vehicle-crash detection.

DETAILED DESCRIPTION

In methods for triggering pedestrian protection systems, widely differing sensor principles of acceleration sensors, pressure sensors, knock sensors, piezoelectric to optical sensors, etc., may be used. In this connection, the acceleration sensors have the advantage that they may also be used at the same time as upfront sensors. The acceleration sensors are mounted at locations such as on the radiator support or on the bumper and sense in the x-direction. In addition, a method or an algorithm concept has already been proposed which makes a triggering decision for a pedestrian protection arrangement on the basis of input signals, which may be acceleration signals. Also included in the proposed algorithm concept is an offset-detection block which, by comparing the signals of a right and a left sensor, determines whether an impact has taken place centrally or in a displaced manner relative to the center of the vehicle front, i.e., with an offset. This offset information then leads to different triggering thresholds for the various characteristics, depending upon whether an offset was or was not detected.

According to the exemplary embodiment and/or exemplary method of the present invention, a method for detecting offset is provided which, in the event of a collision with an object, extracts characteristics for determining the offset of the impact point using the sensor data from at least two sensors, absolute values and/or differential values and/or composite values and/or maximum values and/or minimum values of the sensor data from the at least two sensors being determined in the characteristics extraction. In further refinements, vehicle data, which may be made available by a vehicle bus system, may be used for the characteristics extraction; the vehicle data may include the vehicle's own speed and/or a yaw rate and/or a relative speed with respect to a specific object.

Figure 1:
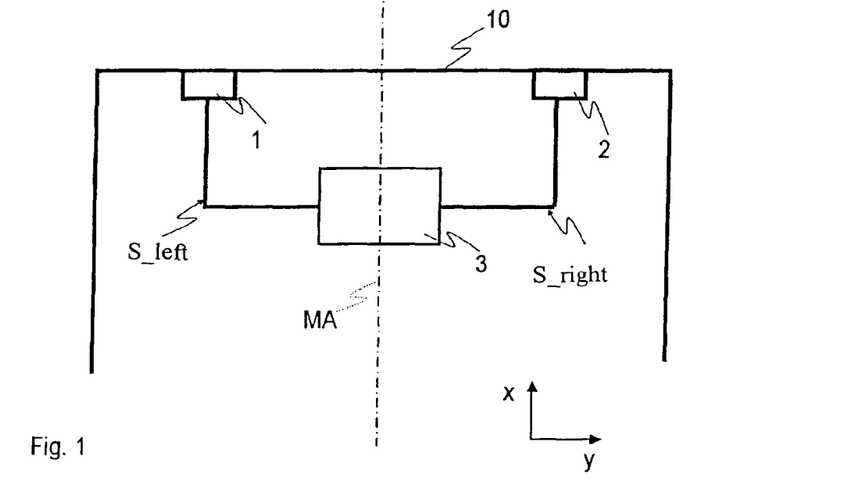
FIG. 1 a schematic block diagram of a device for offset detection.

FIG. 1 shows a device which utilizes the exemplary method of the present invention for detecting offset. As is evident from FIG. 1, the exemplary embodiment of the device shown includes an evaluation and control unit 3 which evaluates sensor data S_left and S_right from two sensors 1 and 2, disposed symmetrically relative to a vehicle center axis MA on vehicle front 10, for detecting offset, sensor 1 being situated left of vehicle center axis MA and sensor 2 being situated right of the vehicle center axis. Evaluation and control unit 3 makes the ascertained offset available to a method or a device for triggering a pedestrian protection device which, as a function of the offset detection, activates a specific pedestrian protection arrangement, such as airbags in the A-pillar, on only one side of the vehicle, or with different strengths on both sides of the vehicle. The exemplary embodiment and/or exemplary method of the present invention is described in the following with reference to FIGS. 1 through 8 using a system having two acceleration sensors 1, 2 as an example. However, the method may be used in the same or in a slightly modified form on other sensors such as knock sensors, as well. An expansion of the device to more than two sensors is also possible.

Figure 2:
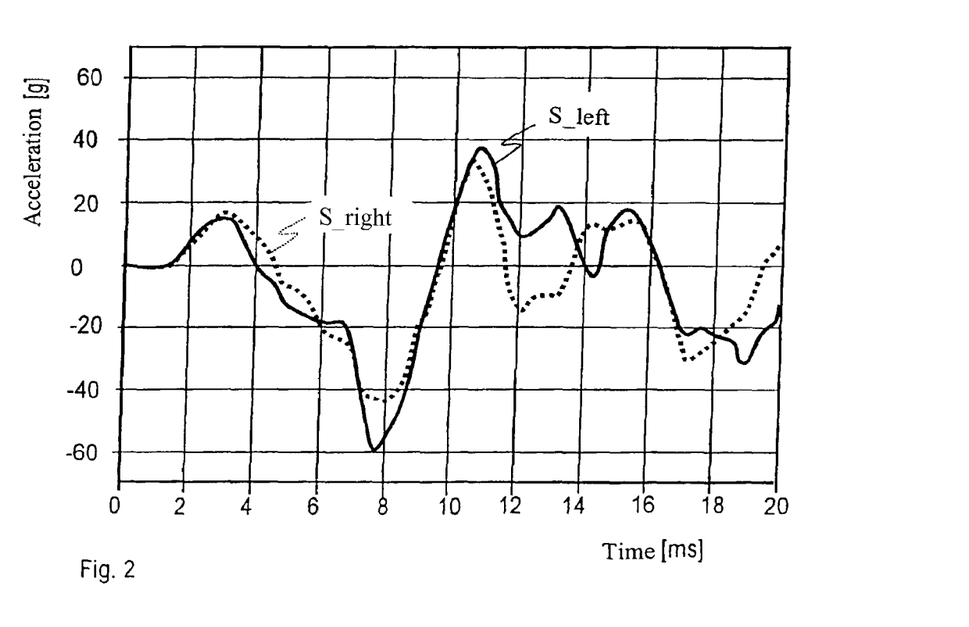
FIG. 2 shows a schematic illustration of sensor-signal patterns, given an impact of an object with a speed of 20 km/h without offset.

FIG. 2 shows a schematic illustration of the signal pattern of sensor data S_left and S_right, given an impact of an object with a speed of 20 km/h without offset. As evident from FIG. 2, sensor data S_left and S_right from right and left sensors 1, 2 are virtually identical for an impact without offset. That is, the differential signal formed from sensor data S_left and S_right is virtually zero, while the composite signal from the two signals S_left and S_right assumes large values.

Figure 3:
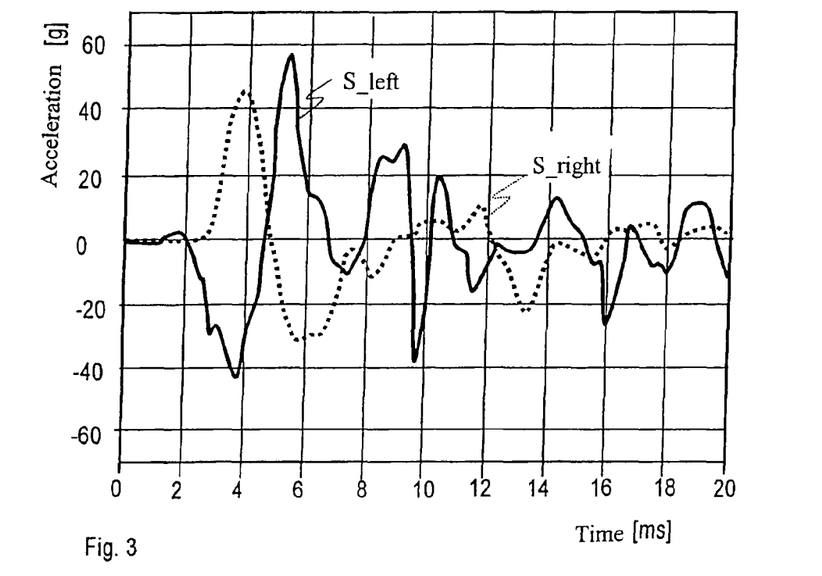
FIG. 3 shows a schematic illustration of sensor-signal patterns, given an impact of an object with a speed of 20 km/h with a small offset (200 mm).

FIG. 3 shows a schematic illustration of the signal pattern of sensor data S_left and S_right, given an impact of an object with a speed of 20 km/h with a small offset of, e.g., y=200 mm. As evident from FIG. 3, given an offset of y=200 mm, sensor data S_left and S_right swing in phase opposition. That is to say, the differential signal formed from sensor data S_left and S_right is large, while the composite signal cancels out almost to zero.

Figure 4:
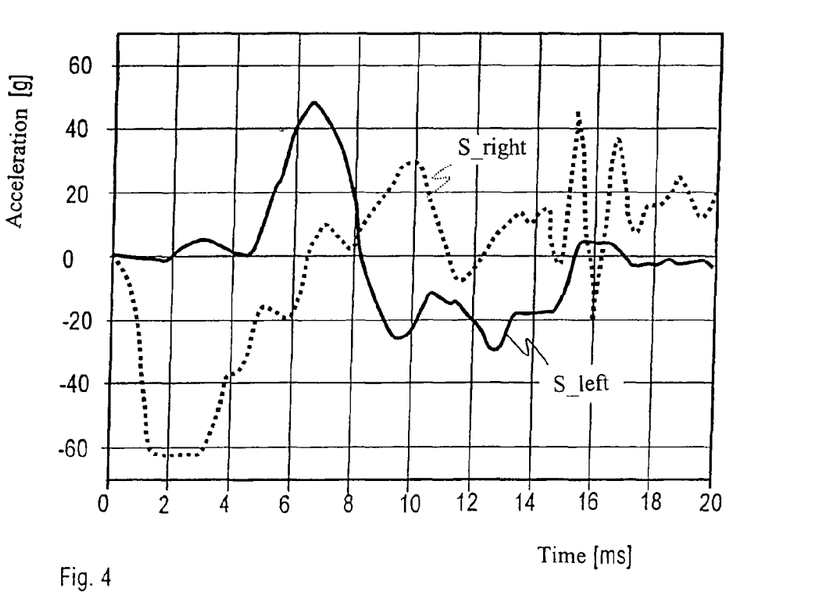
FIG. 4 shows a schematic illustration of sensor-signal patterns, given an impact of an object with a speed of 20 km/h with a large offset (500 mm).

FIG. 4 shows a schematic illustration of the signal pattern of sensor data S_left and S_right, given an impact of an object with a speed of 20 km/h with a large offset of, e.g., y=500 mm. In the case of the impact with an offset of y=500 mm, in the exemplary embodiment shown, the impact takes place in the vicinity of right acceleration sensor 2, which is mounted approximately 580 mm away from vehicle center axis MA. As is clear from FIG. 4, right sensor 2 detects markedly greater signal data than left sensor 1. The phase of signal sensor data S_right and S_left is such that the differential signal from the two sets of sensor data S_left and S_right is approximately as great as the composite signal.

Starting from these signal properties, a first characteristic Diff_Sum_Ratio for the offset detection compares the differential signal and the composite signal from the two sets of signal sensor data S_left and S_right. The exemplary embodiment described in each case advantageously forms the differential signal and the composite signal from the absolute values of the two sets of sensor data S_left and S_right, which are summed up over time. In this manner, more robust values are yielded. First characteristic Diff_Sum_Ratio is then formed, for example, by a division of the differential signal by the composite signal. Equation 1 shows the determination of the differential signal, equation 2 shows the determination of the composite signal and equation 3 shows the determination of first characteristic Diff_Sum_Ratio.

$$\text{Diff\_Abs\_Int} = \int |S\_left - S\_right| \tag{1}$$

$$\text{Sum\_Abs\_Int} = \int |S\_left + S\_right| \tag{2}$$

$$\text{Diff\_Sum\_Ratio} = \frac{\text{Diff\_Abs\_Int}}{\text{Sum\_Abs\_Int}} \tag{3}$$

Figure 5:
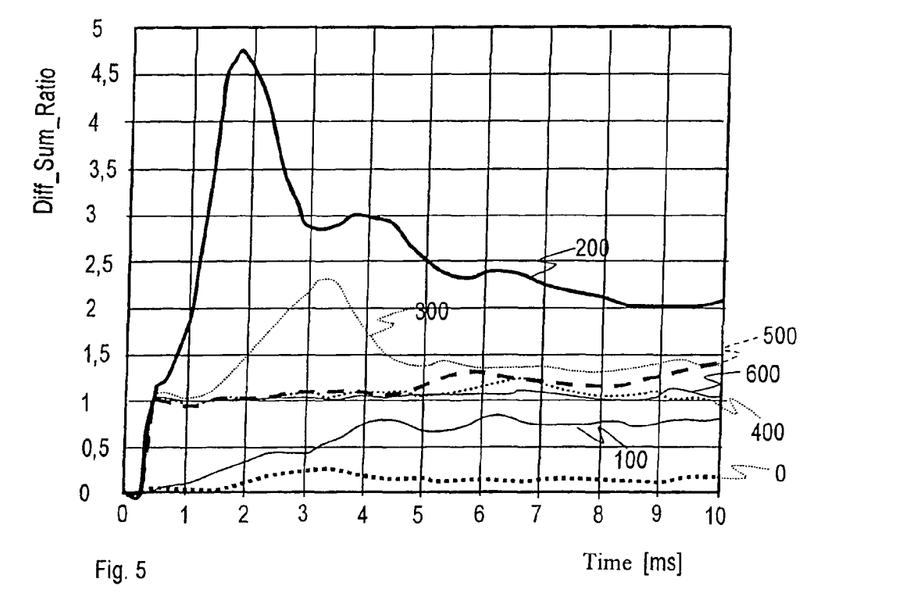
FIG. 5 shows a schematic curve of a characteristic Diff_Sum_Ratio over time for different offsets, given an impact of the object with a speed of 20 km/h.

The summation begins when the pedestrian protection algorithm starts its calculations. This usually happens when the measured acceleration or deceleration exceeds a specific noise threshold. FIG. 5 shows first characteristic Diff_Sum_Ratio for various cases. Curves of first characteristic Diff_Sum_Ratio as a function of time are shown for various offsets between 0 and 600 mm, the curves first being shown after the exceeding of the noise threshold. As is apparent from FIG. 5, the values of first characteristic Diff_Sum_Ratio for the various offset values can be differentiated at a predefined instant after the start of the algorithm, e.g., 4 ms.

To form a second characteristic Max_Min_Ratio, the absolute values of right sensor data S_right and left sensor data S_left, respectively, are summed up. After that, the larger of the two values is compared to the smaller value. If both sensors 1, 2 detect a signal having the same magnitude, then the comparison yields a value 1. Otherwise, the comparison yields values larger than 1. For example, the ratio of the two values may be formed for the signal comparison, the value 1 just being subtracted from the ascertained quotient for producing second characteristic Max_Min_Ratio. Equation 4 shows the determination of the absolute value of right sensor data S_right, and equation 5 shows the determination of the absolute value of left sensor data S_left. Equation 6 shows the determination of maximum value Max_Abs_Int of the two absolute values Right_Abs_Int and Left_Abs_Int, and equation 7 shows the determination of minimum value Min_Abs_Int of the two absolute values Right_Abs_Int and Left_Abs_Int. Equation 8 shows the determination of second characteristic Max_Min_Ratio.

$$\text{Right\_Abs\_Int} = \int |S\_right| \tag{4}$$

$$\text{Left\_Abs\_Int} = \int |S\_left| \tag{5}$$

$$\text{Max\_Abs\_Int} = \max(\text{Right\_Abs\_Int}, \text{Left\_Abs\_Int}) \tag{6}$$

$$\text{Min\_Abs\_Int} = \min(\text{Right\_Abs\_Int}, \text{Left\_Abs\_Int}) \tag{7}$$

$$\text{Max\_Min\_Ratio} = \frac{\text{Max\_Abs\_Int}}{\text{Min\_Abs\_Int}} - 1 \tag{8}$$

Figure 6:
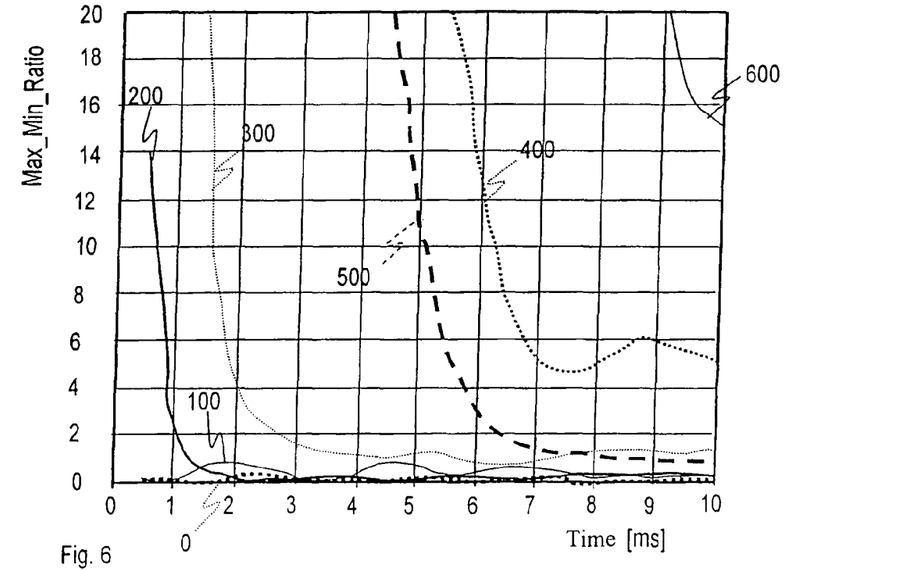
FIG. 6 shows a schematic curve of a characteristic Max_Min_Ratio over time for different offsets, given an impact of the object with a speed of 20 km/h.

FIG. 6 shows curves of second characteristic Max_Min_Ratio for various cases with offsets between 0 and 600 mm as a function of the time after the algorithm was started. As evident from FIG. 6, through the values of second characteristic Max_Min_Ratio, the various offset values in connection with first characteristic Diff_Sum_Ratio can be differentiated at a specific instant after the start of the algorithm, e.g., 4 ms.

Based on the comparison of the two absolute values Right_Abs_Int and Left_Abs_Int of the two sets of sensor data S_right and S_left, it can easily be recognized whether the impact took place on the right or the left side of the vehicle. The information concerning the contact side may likewise be made available to the decision logic for the pedestrian protection arrangement. A specific pedestrian protection arrangement, e.g., airbags in the A-pillar, may thereby be activated only on one side of the vehicle, or be activated with different strengths on both sides of the vehicle.

If, unlike the exemplary embodiment shown, the vehicle has an unsymmetrical front structure or the at least two sensors 1, 2 are not situated symmetrically with respect to vehicle center axis MA, the characteristics previously described may nevertheless be used if respective sensor data S_left and S_right are multiplied with different compensation factors for right and left, so that in the case of an impact without offset, right and left sensor data S_left and S_right are again of equal magnitude after the compensation.

Figure 7:
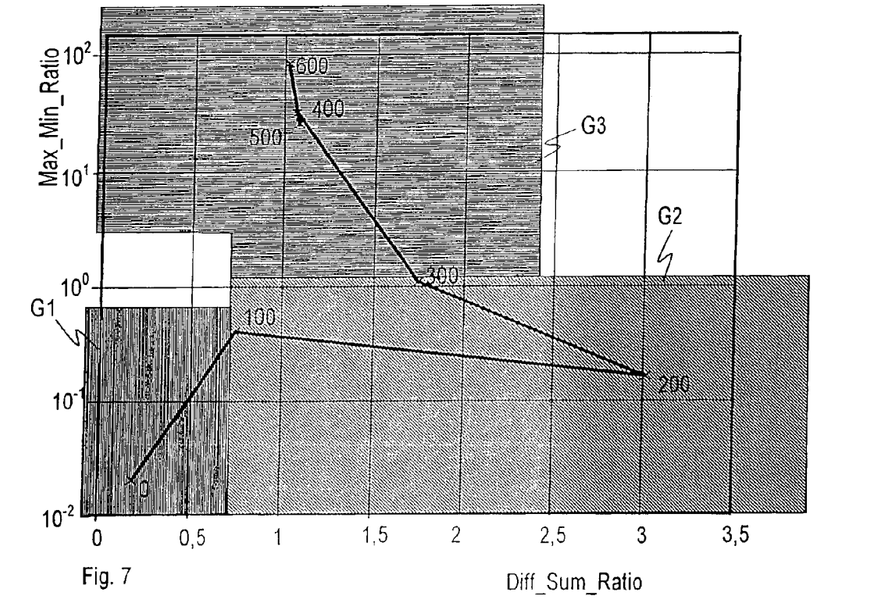
FIG. 7 shows a schematic illustration of a characteristics space of the characteristics Diff_Sum_Ratio and Max_Min_Ratio having three different regions.

Evaluation and control unit 3 evaluates the two characteristics Diff_Sum_Ratio and Max_Min_Ratio at a specific instant, e.g., 4 ms after the start of the algorithm. For the offset detection, a comparison with different thresholds is used to checked in which region of a characteristics space the impact in question is located. A partitioning of the characteristics space into three regions G1, G2 and G3 is shown in FIG. 7, region G1 representing the 0 offset, region G2 representing the 200 mm offset and region G3 representing the 500 mm offset. The curve drawn in shows the offset decision with the values of the two characteristics Diff_Sum_Ratio and Max_Min_Ratio which they have assumed at instant 4 ms after the start of the algorithm. If characteristics Diff_Sum_Ratio and Max_Min_Ratio are not in any of regions G1 to G3 marked in, then an implausible situation exists, and a default value is used for the offset detection.

Figure 8:
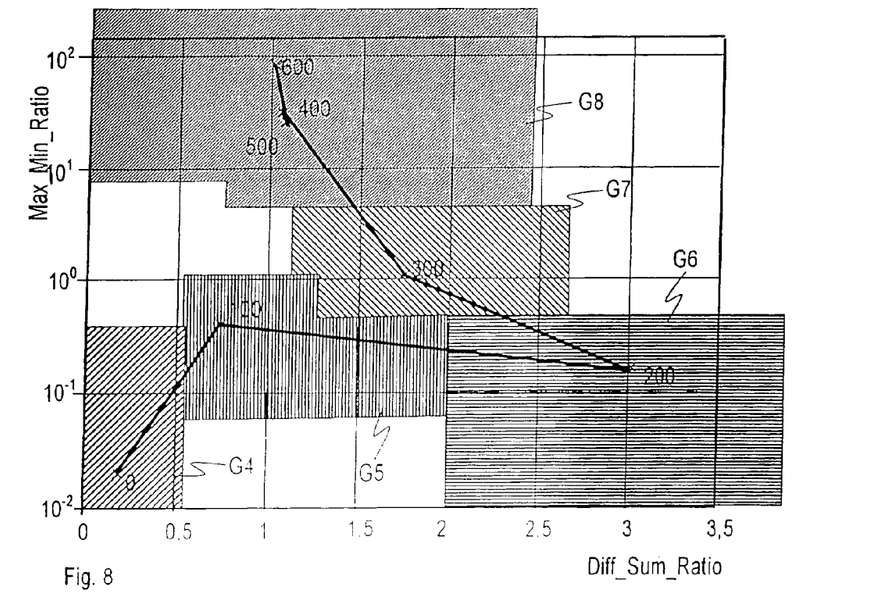
FIG. 8 shows a schematic illustration of the characteristics space of the characteristics Diff_Sum_Ratio and Max_Min_Ratio having five different regions.

The various offset situations may also be classified more finely by subdividing the characteristics space into more than three regions G1 through G3. FIG. 8 shows the case with five regions G4 through G8, in which region G4 represents the 0 offset, region G5 represents the 100 mm offset, region G6 represents the 200 mm offset, region G7 represents the 300 mm offset and region G8 represents the 500 mm offset.

Alternatively, the two characteristics Diff_Sum_Ratio and Max_Min_Ratio may also be evaluated at different instants. Thus, for example, first characteristic Diff_Sum_Ratio may be evaluated after 4 ms, and second characteristic Max_Min_Ratio may be evaluated after 6 ms. Instead of the evaluation of characteristics Diff_Sum_Ratio and Max_Min_Ratio at a specific instant after the start of the algorithm, the average value of characteristics Diff_Sum_Ratio and Max_Min_Ratio in a specific time interval may also be used for a decision. It is also conceivable to detect offset using only one of the two characteristics Diff_Sum_Ratio and Max_Min_Ratio alone, or to combine the two characteristics Diff_Sum_Ratio and Max_Min_Ratio in a manner other than that described. Moreover, the instant or the time interval used for the offset detection may be predefined as a function of vehicle data, for example, as a function of the vehicle's own speed and/or the relative speed with respect to a specific object, which, for instance, are made available via the CAN bus.

In addition, for an offset detection that is even more precise and robust, further characteristics may be combined with characteristics Diff_Sum_Ratio and Max_Min_Ratio described here. Thus, for example, the time interval of the maximum deceleration peaks and/or acceleration peaks may be incorporated in the decision or used for determining plausibility. As evident from FIGS. 2 through 4, the time interval between the deceleration peaks of right sensor data S_right and left sensor data S_left is, for example, approximately 0 ms in the case without offset, approximately 2 ms for an offset of 200 mm and approximately 7 ms for an offset of 500 mm.

In addition, the offset decision may be further improved if the sign of the first acceleration peak of the two sets of sensor data S_left, S_right is taken into consideration at the same time. As FIG. 2 shows, given an offset of y=0, the sign of the first acceleration peak of both sets of sensor data S_left, S_right is positive for both sensors 1, 2, while in the case of an existing offset, the one sign is positive and the other sign is negative, as is evident from FIGS. 3 and 4.

The detection of the contact side may also be improved by a comparison of these signs; this is particularly helpful in the case when the signals swing in phase opposition, as shown in FIG. 3.

THE LIST OF REFERENCE NUMERALS IS AS FOLLOWS:

0 characteristics curve for an offset of 0
1 left sensor
2 right sensor
3 evaluation and control unit
10 vehicle front
100 characteristics curve for an offset of 100 mm
200 characteristics curve for an offset of 200 mm
300 characteristics curve for an offset of 300 mm
400 characteristics curve for an offset of 400 mm
500 characteristics curve for an offset of 500 mm
600 characteristics curve for an offset of 600 mm
MA vehicle center axis
S_right right sensor data
S_left left sensor data
G1 through G8 regions in the characteristics space
Diff_Sum_Ratio first characteristic
Max_Min_Ratio second characteristic

What is claimed is:

1. A method for detecting an offset for a pedestrian protection arrangement, the method comprising:
    determining sensor data;
    evaluating the sensor data to determine an impact point of an object, wherein for a collision with an object, characteristics are extracted for determining the offset of the impact point using the sensor data from at least two sensors; and
    determining, in a characteristics extraction, at least one of absolute values, differential values representing a difference between respective sensor data of the at least two sensors, and composite values representing a sum of the respective sensor data of the at least two sensors;
    wherein the pedestrian protection arrangement is:
        triggerable on both sides of the vehicle; and
        is triggered on only a left or right side of the vehicle or with different strengths on both sides of the vehicle as a function of a determined offset value.

2. The method of claim 1, wherein vehicle data are used for the characteristics extraction, the vehicle data including at least one of a speed, a yaw rate, and a relative speed.

3. The method of claim 1, wherein further characteristics for determining the offset are formed from at least one of vehicle data, a time interval, a sign of maximum values of the sensor data of the at least two sensors, and a sign of minimum values of the sensor data of the at least two sensors.

4. A method for detecting an offset for a pedestrian protection arrangement, the method comprising:
    determining sensor data;
    evaluating the sensor data to determine an impact point of an object; and
    for a collision with an object, extracting characteristics for determining an offset of the impact point using the sensor data from at least two sensors;
    wherein:
        the characteristics extraction includes:
            obtaining a differential signal and a composite signal based on the sensor data from the at least two sensors, the differential signal representing a difference between respective sensor data of the at least two sensors, and the composite signal representing a sum of the respective sensor data of the at least two sensors; and
            comparing the differential signal and the composite signal;
        the characteristics includes a first characteristic that is extracted from the comparison of the differential signal and the composite signal; and
        the pedestrian protection arrangement is:
            triggerable on both sides of the vehicle; and
            triggered on only a left or right side of the vehicle or with different strengths on both sides of the vehicle as a function of a determined offset value.

5. The method of claim 4, wherein prior to the signal comparison, absolute values of the differential signal and of the composite signal, respectively, are formed and summed up over time, a ratio of the absolute value of the differential signal and the absolute value of the composite signal being formed for the signal comparison.

6. The method of claim 4, wherein to determine the offset, the first characteristic is evaluated at at least one predefined instant.

7. The method of claim 6, wherein the evaluation instant is established as a function of vehicle data.

8. The method of claim 4, wherein to determine the offset, an average value of the first characteristic is evaluated within at least one predefined time interval.

9. The method of claim 8, wherein the evaluation time interval is established as a function of vehicle data.

10. A method for detecting an offset for a pedestrian protection arrangement, the method comprising:
determining sensor data;
evaluating the sensor data to determine an impact point of an object; and
for a collision with an object, extracting a characteristic for determining an offset of the impact point using the sensor data from at least two sensors;
wherein the characteristics extraction includes:
summing absolute values of the sensor data of each of the at least two sensors;
determining a maximum value and a minimum value of the summed absolute values; and
comparing the maximum and minimum values to produce a first characteristic; obtaining a differential signal and a composite signal based on the sensor data from the at least two sensors; and comparing the differential signal and the composite signal to produce a second characteristic; the differential signal is a difference between respective sensor data of the at least two sensors; the composite signal is a sum of the respective sensor data of the at least two sensors; and for determining the offset, a characteristics space formed by the first and second characteristics is partitioned by various thresholds into a plurality of regions, and it is determined whether the first characteristic and the second characteristic are located in one of the plurality of regions.

11. The method of claim 10, wherein for a signal comparison, the ratio of the determined maximum value and the determined minimum value is formed, from which the value 1 is subtracted to form the first characteristic.

12. The method of claim 10, wherein to determine the offset, the first characteristic produced by the comparison of the maximum and minimum values is evaluated at at least one predefined instant.

13. The method of claim 12, wherein the evaluation instant is established as a function of vehicle data.

14. The method of claim 10, wherein to determine the offset, an average value of the first characteristic produced by the comparison of the maximum and minimum values is evaluated within at least one predefined time interval.

15. The method of claim 14, wherein the evaluation time interval is established as a function of vehicle data.

16. The method of claim 10, wherein a default value is used for determining the offset when the first characteristic and the second characteristic are not located in any of the plurality of regions.

17. The method of claim 10, wherein the plurality of regions includes three regions.

18. The method of claim 10, wherein the plurality of regions includes five regions.

19. A method for detecting an offset for a pedestrian protection arrangement, the method comprising:
determining sensor data;
evaluating the sensor data to determine an impact point of an object, wherein for a collision with an object, characteristics are extracted for determining the offset of the impact point using the sensor data from at least two sensors;
determining, in a characteristics extraction, at least one of absolute values, differential values representing a difference between respective sensor data of the at least two sensors, and composite values representing a sum of the respective sensor data of the at least two sensors; and
modifying the sensor data to compensate for at least one of an unsymmetrical front structure of the vehicle and an unsymmetrical arrangement of the at least two sensors relative to the longitudinal vehicle access.

20. The method of claim 19, wherein, when there is an impact without offset, the modifying makes magnitudes of the sensor data of the at least two sensors equal.

21. The method of claim 19, wherein the sensor data of a first one of the at least two sensors are multiplied by a first value and the sensor data of a second one of the at least two sensors are multiplied by a second value that is different than the first value, such that, where there is an impact without an offset, the multiplied values of the first and second sensors are equal.

22. A method for a protection arrangement of a vehicle, the method comprising:
obtaining, by a computer processor, sensor data from a first sensor positioned to a right of a center of the vehicle;
obtaining, by the processor, sensor data from a second sensor positioned to a left of the center of the vehicle;
calculating, by the processor, a difference between the sensor data of the first sensor and the sensor data of the second sensor;
calculating, by the processor, a sum of the sensor data of the first sensor and the sensor data of the second sensor; and
based on the calculated difference and calculated sum, triggering, by the processor, a protection arrangement;
wherein the sensor data characterizes a collision of the vehicle.

23. The method of claim 22, further comprising:
calculating a ratio of an absolute value of the calculated difference to an absolute value of the calculated sum, wherein the triggering is based on the calculated ratio.

24. The method of claim 23, further comprising:
categorizing an offset of an object, with which the vehicle collided during the collision, from the center of the vehicle based on the calculated ration, wherein the triggering is based on the categorization.

25. A method for a protection arrangement of a vehicle, the method comprising:
obtaining, by a computer processor, sensor data from a first sensor positioned to a right of a center of the vehicle;
obtaining, by the processor, sensor data from a second sensor positioned to a left of the center of the vehicle;
calculating, by the processor, a sum of the sensor data from the first sensor;
calculating, by the processor, a sum of the sensor data from the second sensor;
comparing the sum of the sensor data from the first sensor and the sum of the sensor data of the second sensor; and
based on the comparison, triggering, by the processor, a protection arrangement;
wherein the sensor data characterizes a collision of the vehicle.

26. The method of claim 25, wherein the comparison includes:
calculating an absolute value of the sum of the sensor data from the first sensor;
calculating an absolute value of the sum of the sensor data from the second sensor;
determining which of the absolute values is greater;
calculating a quotient of the determined greater one of the absolute values divided by the other of the absolute values; and
subtracting 1 from the quotient.

\* \* \* \* \*